Oct. 17, 1950     R. W. PHELPS     2,526,155
BUSHING FOR WAGONS

Filed Feb. 2, 1948

INVENTOR
R.W. PHELPS

BY Featherstonhaugh & Co.

ATTORNEYS

Patented Oct. 17, 1950

2,526,155

UNITED STATES PATENT OFFICE 2,526,155

BUSHING FOR WAGONS

Ross W. Phelps, Orillia, Ontario, Canada

Application February 2, 1948, Serial No. 5,875

8 Claims. (Cl. 308—134.1)

This invention relates to a bearing and more particularly to a bearing suited for front or turning wheels of farm wagons and like applications, and a mounting therefor.

It is an object of this invention to provide a bearing construction for use in farm wagons and like applications which can be quickly and easily assembled and disassembled.

It is a further object of this invention to provide a bearing construction in which the bearings can be easily and cheaply replaced.

It is a still further object of this invention to provide a bearing which is easy to lubricate.

With these and other objects in view the invention generally comprises a bearing including a grease tube with removably mountable bushings adapted to be retained adjacent the upper and lower ends thereof. The bushings are adapted to journal a spindle having a load plate secured thereto. The grease tube is mounted in a member to be supported by the load plate such as the bolster of a wagon, so that the load plate supports the bolster and the spindle is journaled within the bushings. The invention will be clearly understood after reference to the following detailed specification read in conjunction with the drawings.

Figure 1:
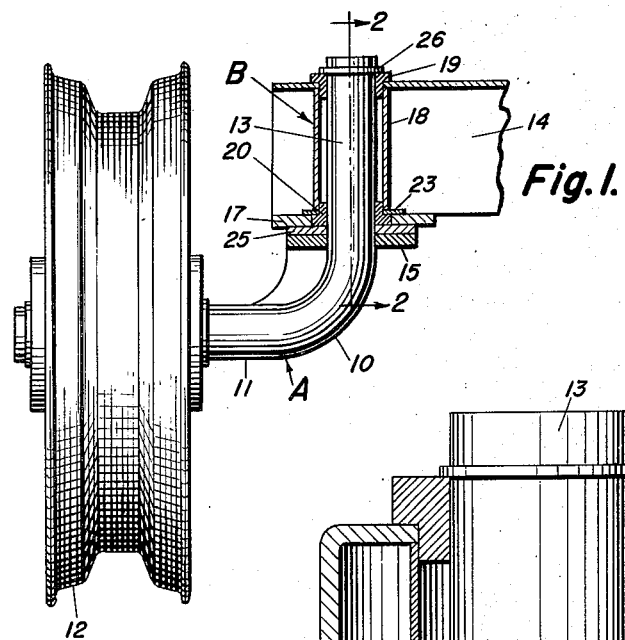
Figure 1 is a partial view of a wagon showing a portion of a bolster, a wheel and wheel mounting mounted in the bolster according to the invention. The view is partly in section to show construction.
Figure 2:
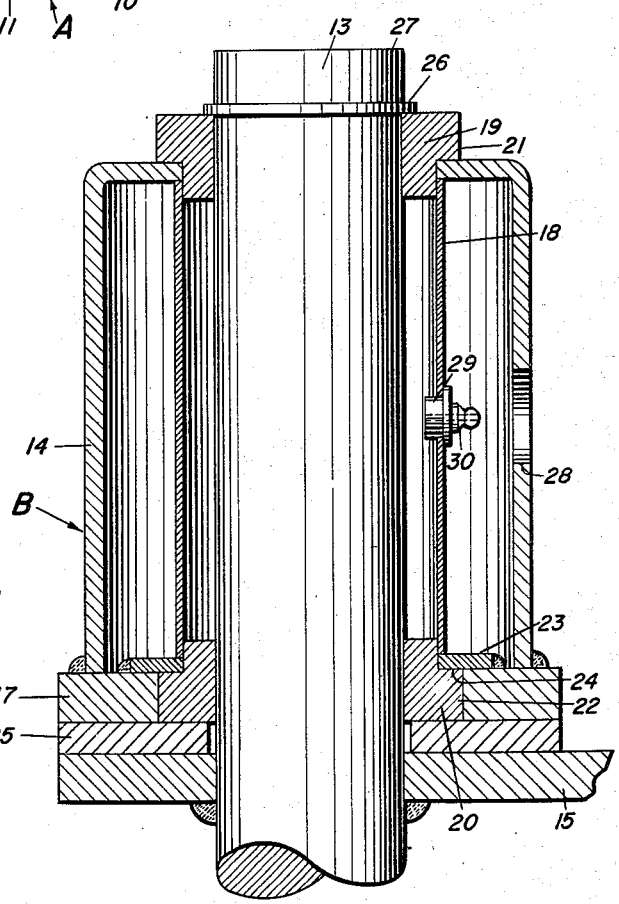
Figure 2 is an enlarged section taken along lines 2—2 of Figure 1.

In the drawings the letter A generally designates the wheel unit of a farm wagon and comprise an L-shaped member 10, the arm 11 of which is adapted to serve as an axle for a wagon wheel 12, and the arm 13 of which is adapted to serve as a spindle designed to be mounted for axial rotation within the bearing B in a front wagon bolster 14. A load plate 15 rigidly secured to the spindle 13 by any suitable means such as welding forms a support for the bolster. Means for controlling the axial movement of the spindle 13 and the wheel unit A in the bearing B can be connected to the load plate 15. Such control means are well known and since they do not form part of the present invention are not shown in the drawings.

The wagon bolster 14 comprises a beam having a channel-like cross section. According to the embodiment of the invention shown a bottom plate 17 extends over at least part of the open side of the beam and is secured thereto by welding or any other suitable means. The beam 14 and bottom plate 17 are then vertically bored to receive a grease tube 18, which in turn is designed to retain bushings 19 and 20 adjacent its ends. The bushings 19 and 20 can be made from any suitable material such as cast iron and are adapted to journal the spindle 13 in spaced apart relation to the sides of the grease tube 18 as will be described more fully later.

In the embodiment of the invention shown the bushings 19 and 20 are formed with external shoulders 21 and 22 which are adapted to overlie the marginal edges of the grease tube 18. The bottom plate 17 encases the outer edge of the shoulder 22 of bushing 20 and an annular plate 23, secured to the upper side of the bottom plate 17 and extending to the grease tube 18, abuts the surface 24 of the bushing 20. The annular plate 23 is secured to the bottom plate 17 by welding or any other suitable means.

To assemble a wheel unit in the bearing described it is merely necessary to insert the spindle 13 into the bushings 19 and 20 to cause the load plate 15 to abut the under side of the bolster. A washer 25 is interposed between the bottom plate 17 and the load plate 15. The spindle is retained within the bushings 19 and 20 by any suitable means such as a ring 26 which can be sprung to engage in a groove formed in a projecting portion 27 of the spindle 13. The groove and spring ring construction is well known and is not shown in the drawings.

The bolster 14 and grease tube 18 are formed with aligned openings as at 28 and 29 for the purpose of admitting lubricant to the space between the spindle and the interior of the grease tube and hence to the bushings 19 and 20 within the grease tube 18. Closure means 30 is also provided for the opening 29 in the grease tube.

The operation of the wheel unit shown will be apparent. The load on the bolster is supported by the load plate 15 while the wheel unit A as a whole is free to turn within the bearing B.

From the above it will be apparent that I have provided a bearing for wagon and similar applications which accomplishes the objects of the invention.

The bearing can be quickly assembled and disassembled. To assemble the unit it is merely necessary to place the bushings 19 and 20 in position within the grease tube 18, insert the spindle, and slip the ring 26 on the projecting end thereof. The reverse procedure to disassemble the bearing is equally simple. The bushings are very cheap to manufacture, easy to replace and easy to lubricate.

What I claim as my invention is:

1. A bearing for a spindle having a load plate rigidly secured thereto comprising a bolster, a grease tube, said bolster being bored to receive said grease tube, bushings mounted within said grease tube at its free ends, such bushings having bores that align when they are mounted in the free ends of said grease tube to rotatably receive said spindle, said bolster overlying said load plate.

2. A bearing as claimed in claim 1 in which said bolster and grease tube are formed with a grease opening into said tube.

3. A bearing for a spindle as claimed in claim 1 in which each of said bushings are formed with an external shoulder that overlies the end of said grease tube in which it is mounted.

4. A bearing for a spindle having a load plate rigidly secured thereto comprising a bolster formed from channel cross section and a bolster plate closing at least a portion of the open side of said channel, a grease tube, said channel section and bolster plate being formed with aligned bores to receive said grease tube, bushings mounted within said grease tube at its free ends, said bushings having bores that align when they are mounted as aforesaid to receive said spindle, said bolster overlying said load plate.

5. A bearing for a spindle having a load plate as claimed in claim 4 in which each of said bushings are formed with a grease opening into said tube.

6. A bearing as claimed in claim 5 in which said bolster and grease tube are formed with a grease opening into said tube.

7. A bearing as claimed in claim 1 in which a washer fits over said spindle and lies between said bolster and said load plate.

8. A bearing as claimed in claim 4 in which a washer fits over said spindle and lies between said bolster and said load plate.

ROSS W. PHELPS.

REFERENCES CITED

The following references are of record in the file of this patent:

UNITED STATES PATENTS

| Number | Name | Date |
|---|---|---|
| 1,444,238 | Davis | Feb. 6, 1923 |